US011558103B2

(12) United States Patent
Seo et al.

(10) Patent No.: US 11,558,103 B2
(45) Date of Patent: Jan. 17, 2023

(54) METHOD FOR TRANSMITTING OR RECEIVING D2D SIGNAL IN WIRELESS COMMUNICATION SYSTEM AND DEVICE THEREFOR

(71) Applicant: LG ELECTRONICS INC., Seoul (KR)

(72) Inventors: Inkwon Seo, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 16/791,809

(22) Filed: Feb. 14, 2020

(65) Prior Publication Data

US 2020/0186234 A1    Jun. 11, 2020

Related U.S. Application Data

(63) Continuation of application No. 15/741,663, filed as application No. PCT/KR2016/007504 on Jul. 11, 2016, now Pat. No. 10,567,068.

(60) Provisional application No. 62/191,475, filed on Jul. 12, 2015.

(51) Int. Cl.
*H04B 7/155* (2006.01)
*H04W 88/04* (2009.01)

(52) U.S. Cl.
CPC ..... *H04B 7/15507* (2013.01); *H04B 7/15528* (2013.01); *H04W 88/04* (2013.01)

(58) Field of Classification Search
CPC .......... H04B 7/15507; H04B 7/15528; H04W 88/04; H04W 76/14
See application file for complete search history.

(56) References Cited

U.S. PATENT DOCUMENTS

| 6,665,521 B1 * | 12/2003 | Gorday ................. H04B 7/022 340/7.2 |
| 2010/0261469 A1 | 10/2010 | Ribeiro et al. |
| 2015/0173048 A1* | 6/2015 | Seo ....................... H04L 1/0031 370/329 |
| 2015/0230258 A1 | 8/2015 | Kwon ................ H04W 72/082 370/280 |
| 2016/0338079 A1* | 11/2016 | Yeh ....................... H04W 72/10 |

FOREIGN PATENT DOCUMENTS

| EP | 2833694 A2 | 2/2015 |
| WO | 2015026111 A1 | 2/2015 |
| WO | 2015068967 A1 | 5/2015 |
| WO | 2015069051 A1 | 5/2015 |

\* cited by examiner

*Primary Examiner* — Ankur Jain
(74) *Attorney, Agent, or Firm* — Dentons US LLP

(57) ABSTRACT

According to one embodiment of the present invention, a method by which a terminal for supporting device to device (D2D) communication relays a D2D signal comprises the steps of: transmitting, by the terminal, a D2D signal to be relayed to a neighboring terminal; and relaying a signal transmitted by the neighboring terminal, on the basis of the information on the D2D signal, wherein the information on the D2D signal includes information on D2D power, and the information on the D2D power can be determined by considering a reception power difference between D2D signals transmitted on mutually adjacent frequencies.

6 Claims, 12 Drawing Sheets

(a) in coverage    (b) out-of-coverage    (c) partial coverage

FIG. 2
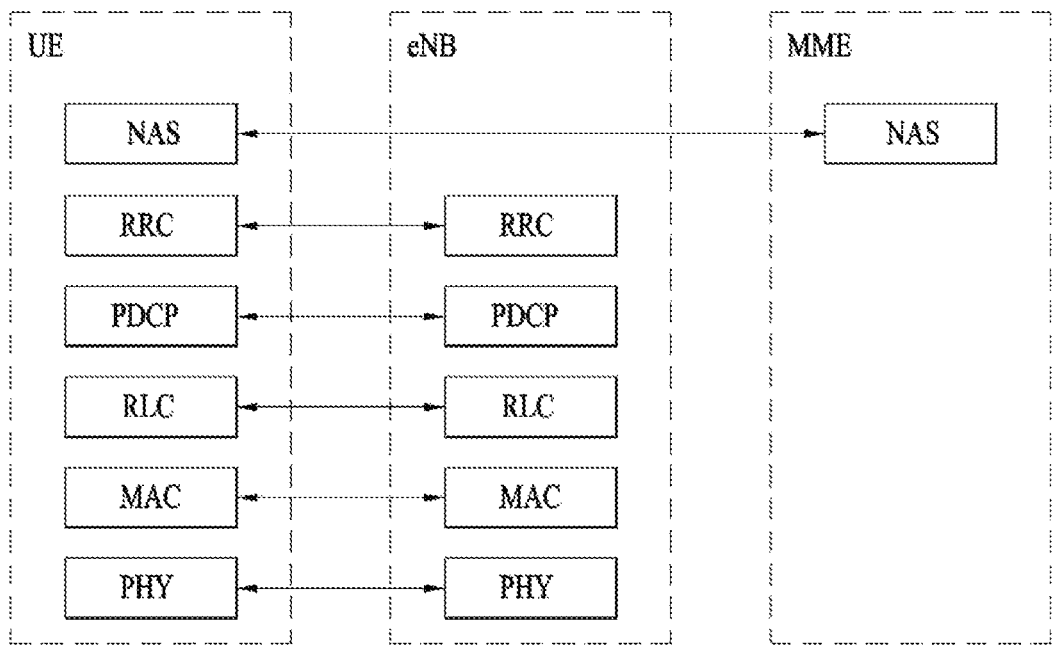
(a) CONTROL-PLANE PROTOCOL STACK
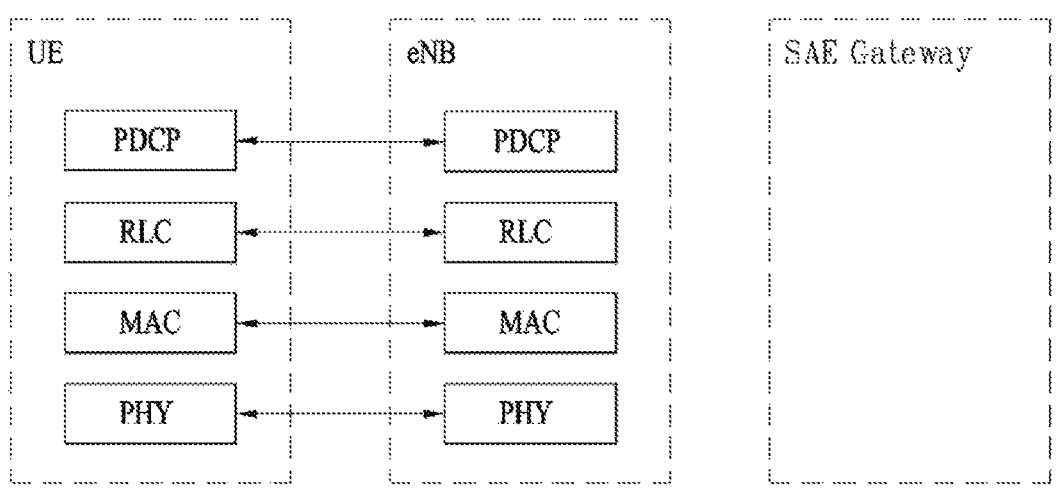
(b) USER-PLANE PROTOCOL STACK (a) in coverage  (b) out-of-coverage  (c) partial coverage

FIG. 12
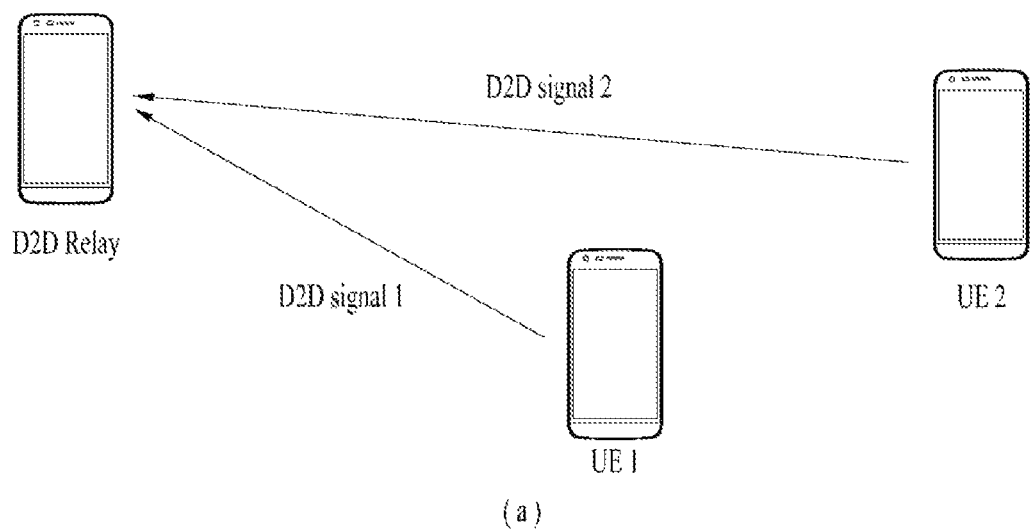
(a)
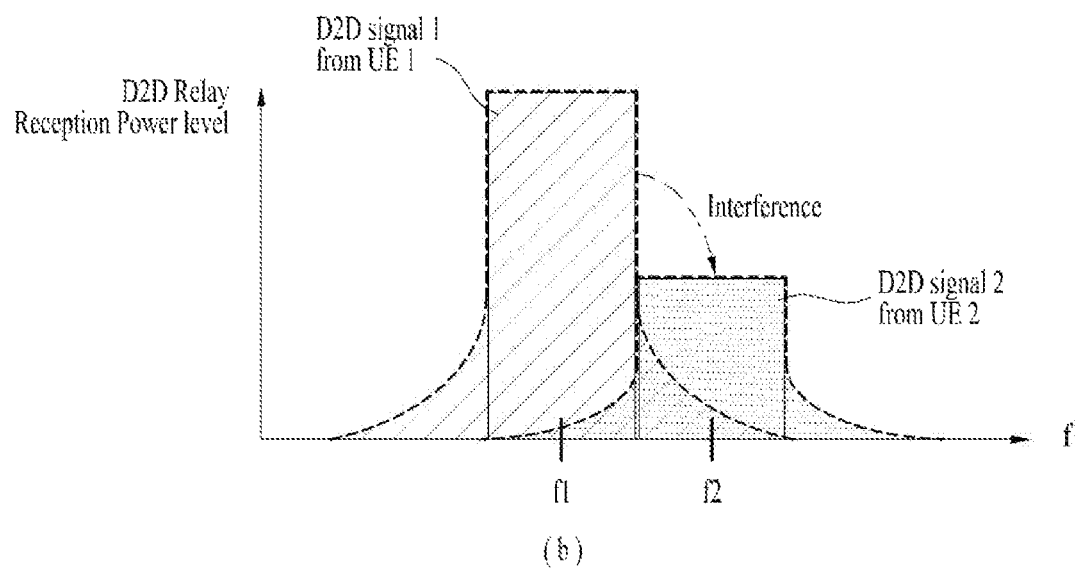
(b)

METHOD FOR TRANSMITTING OR RECEIVING D2D SIGNAL IN WIRELESS COMMUNICATION SYSTEM AND DEVICE THEREFOR

This application is a continuation of U.S. patent application Ser. No. 15/741,663, filed on Jan. 3, 2018, now allowed, which is a 35 USC § 371 National Stage entry of International Application No. PCT/KR2016/007504 filed on Jul. 11, 2016, and claims priority to U.S. Provisional Application No. 62/191,475 filed on Jul. 12, 2015, all of which are hereby incorporated by reference in their entireties as if fully set forth herein.

TECHNICAL FIELD

The present invention relates to a wireless communication system, and more particularly, to a method of transmitting or receiving a D2D signal for relaying the D2D signal in a wireless communication system supporting D2D communication and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

A technical task of the present invention is to propose a method of transmitting or receiving a D2D signal for efficiently relaying the D2D signal in a system supporting D2D communication.

Technical tasks obtainable from the present invention are non-limited by the above-mentioned technical task. And, other unmentioned technical tasks can be inferred from the following embodiments.

Technical Solution

To achieve these and other advantages and in accordance with the purpose of the present invention, as embodied and broadly described, according to one embodiment, a method of relaying a D2D signal by a user equipment (UE) supporting D2D communication, includes transmitting information on the D2D signal to be relayed by the UE to a neighboring UE, and relaying a signal transmitted by the neighboring UE based on the information on the D2D signal. In this case, the information on the D2D signal includes information on D2D power and the information on the D2D power can be determined in consideration of a reception power difference between D2D signals transmitted on frequencies adjacent to each other.

To further achieve these and other advantages and in accordance with the purpose of the present invention, according to a different embodiment, a UE supporting D2D communication includes a transmitter to transmit information on the D2D signal to be relayed by the UE to a neighboring UE and a processor to relay a signal transmitted by the neighboring UE based on the information on the D2D signal. In this case, the information on the D2D signal includes information on D2D power and the information on the D2D power can be determined in consideration of a reception power difference between D2D signals transmitted on frequencies adjacent to each other.

Preferably, the information on the D2D power may correspond to a maximum reception power level of the D2D signal to be relayed by the UE. More preferably, the maximum reception power level may correspond to maximum reception power permitted to a first D2D signal within a range of not causing a decoding failure of a second D2D signal having minimum reception power among the D2D signals transmitted on the frequencies adjacent to each other.

Preferably, the information on the D2D power may be for reducing interference from reception power of a first D2D signal transmitted on a first frequency, to a second D2D signal transmitted on a second frequency. More preferably, the information on the D2D power can include at least one of information on a resource of the first D2D signal interfering the second D2D signal, information on a transmitter of the first D2D signal, and a power reduction value for the first D2D signal.

Preferably, the information on the D2D signal further includes a message type of the D2D signal to be relayed by the UE and the UE may relay a D2D signal of a different message type with a low priority or may not relay the D2D signal of the different message type.

Preferably, the information on the D2D signal can further include information on a size of data capable of being relayed by the UE.

To further achieve these and other advantages and in accordance with the purpose of the present invention, according to a further different embodiment, a method of transmitting a device-to-device (D2D) signal by a user equipment (UE) supporting D2D communication, includes the steps of receiving information on a D2D signal to be relayed by a neighboring UE from the neighboring UE, and transmitting a signal to the neighboring UE based on the information on the D2D signal. In this case, the information on the D2D signal includes information on D2D power and the information on the D2D power can be determined in consideration of a reception power difference between D2D signals transmitted on frequencies adjacent to each other.

Preferably, the information on the D2D power may correspond to a maximum reception power level of the D2D signal to be relayed by the neighboring UE.

Preferably, the information on the D2D power may be for reducing interference from reception power of a first D2D signal transmitted on a first frequency, to a second D2D signal transmitted on a second frequency.

Preferably, the information on the D2D signal further includes a message type of the D2D signal to be relayed by the neighboring UE and the UE can determine transmit power based on the message type.

Preferably, the UE can select a transmit power parameter and a reference signal parameter to be used for transmitting the signal in consideration of whether or not the transmitted signal is relayed by the neighboring UE.

Advantageous Effects

According to one embodiment of the present invention, if a D2D device performing D2D relaying transmits a D2D signal property capable of being relayed by the D2D device to neighboring UEs and relays a D2D signal in accordance with the D2D signal property, it is able to efficiently perform a D2D relaying operation even in chaotic D2D communication environment.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram illustrating structures of a control plane and a user plane of a radio interface protocol between a UE and an E-UTRAN based on the 3GPP radio access network specification.

FIG. 12 is a diagram for explaining in-band emission.

MODE FOR INVENTION

Figure 1:
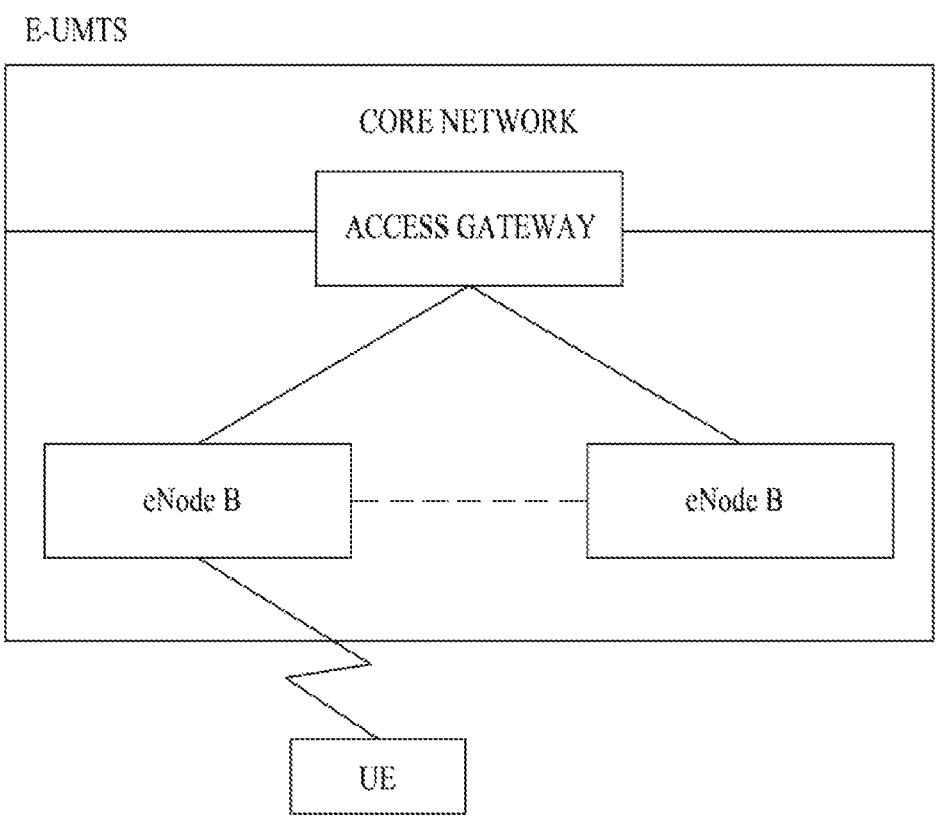
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications. In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
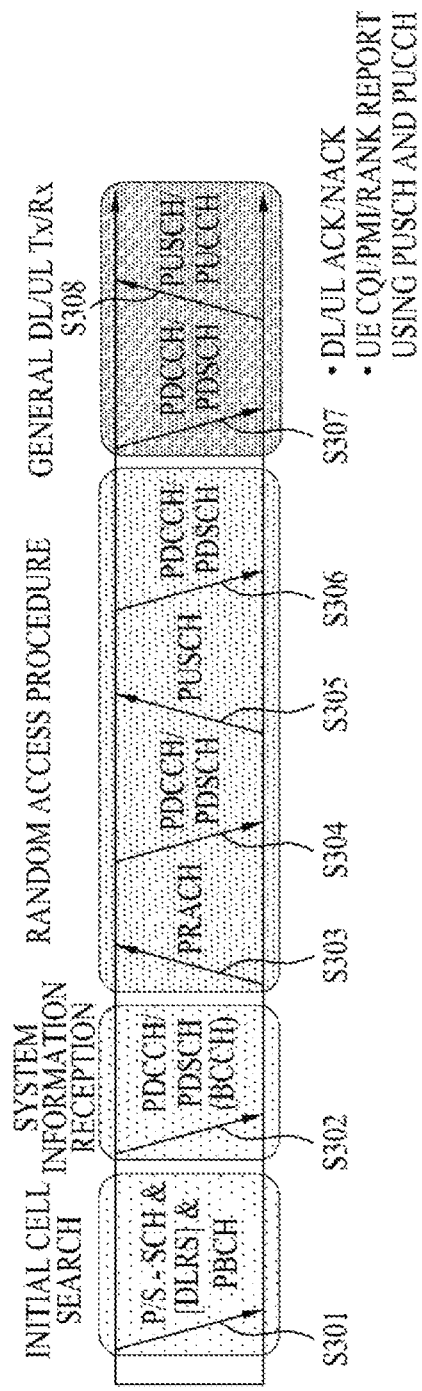
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
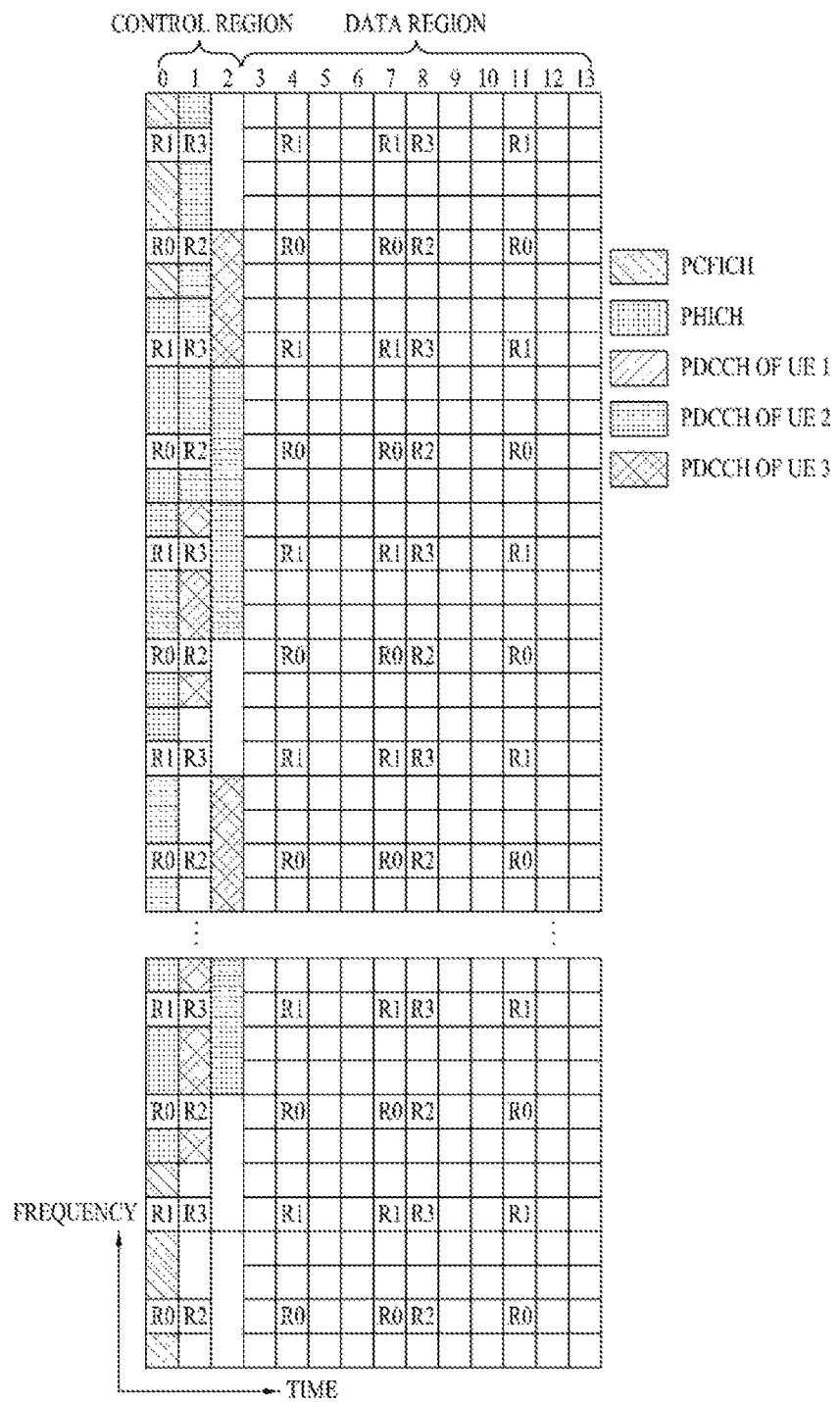
FIG. 4 is a diagram illustrating the structure of a DL radio frame used in an LTE system.

FIG. 4 is a diagram illustrating control channels contained in a control region of one subframe in a DL radio frame.

Referring to FIG. 4, one subframe includes 14 OFDM symbols. The first to third ones of the 14 OFDM symbols may be used as a control region and the remaining 11 to 13 OFDM symbols may be used as a data region, according to subframe configuration. In FIG. 4, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 5:
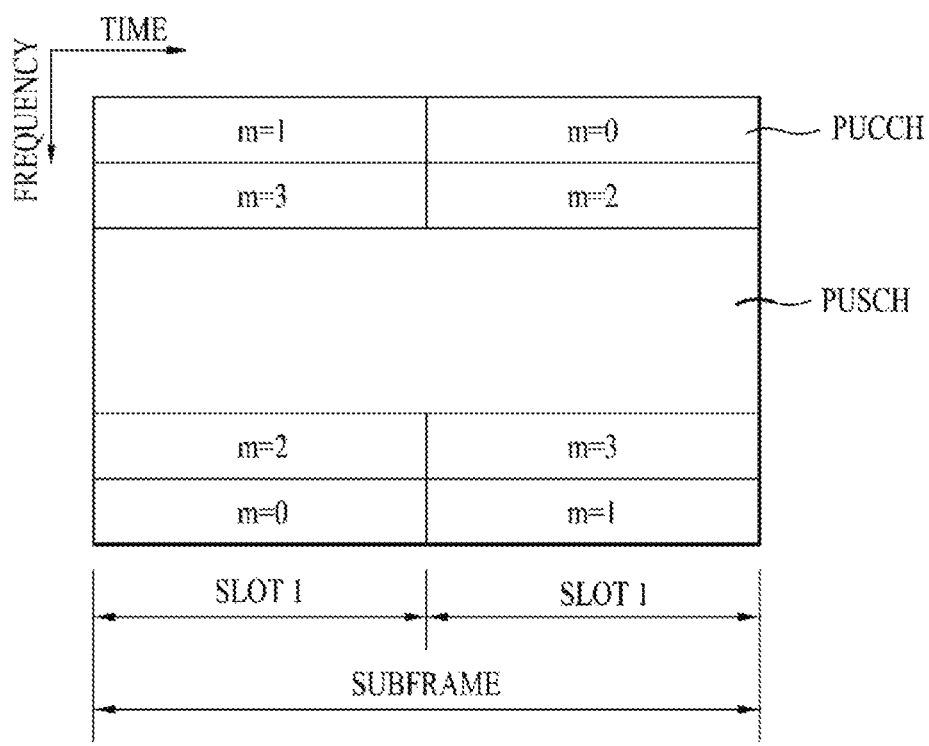
FIG. 5 is a diagram illustrating the structure of a UL subframe in an LTE system.

FIG. 5 is a diagram illustrating the structure of a UL subframe in an LTE system.

Referring to FIG. 5, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 5.

And, time capable of transmitting a sounding reference signal in a subframe corresponds to a symbol period lastly positioned in a subframe in a time axis and the sounding reference signal is transmitted through a data transmission band in frequency axis. Sounding reference signals of a plurality of UEs transmitted through a last symbol of an identical subframe can be distinguished from each other according to a frequency position.

Figure 6:
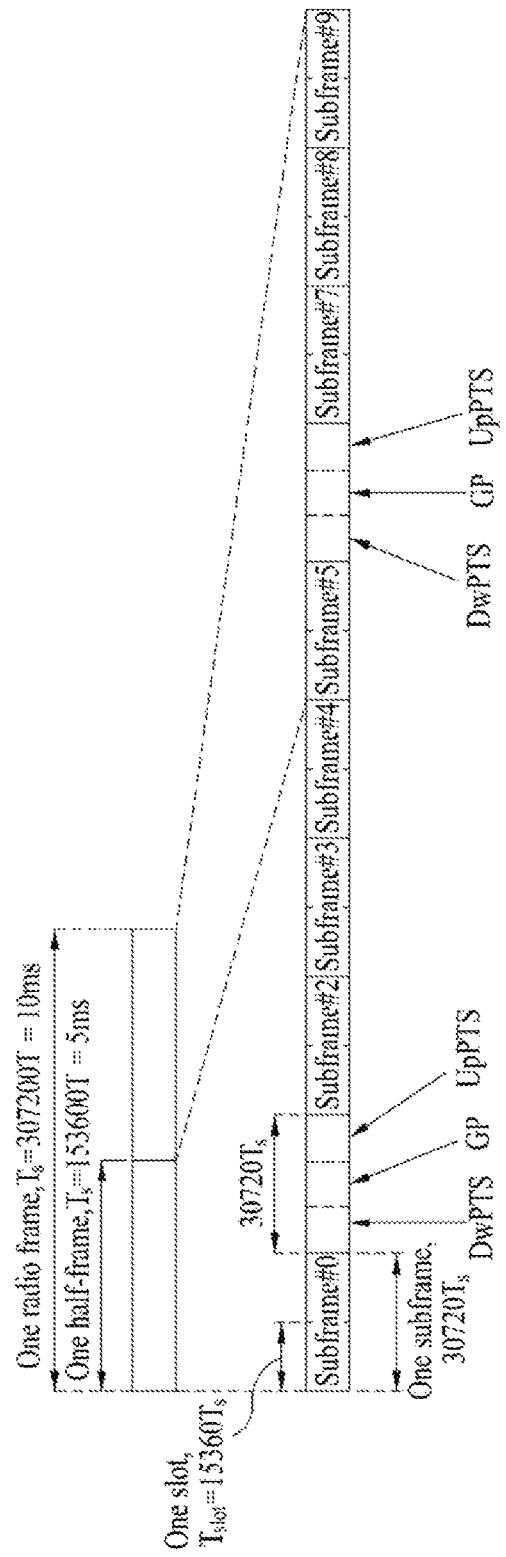
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Figure 7:
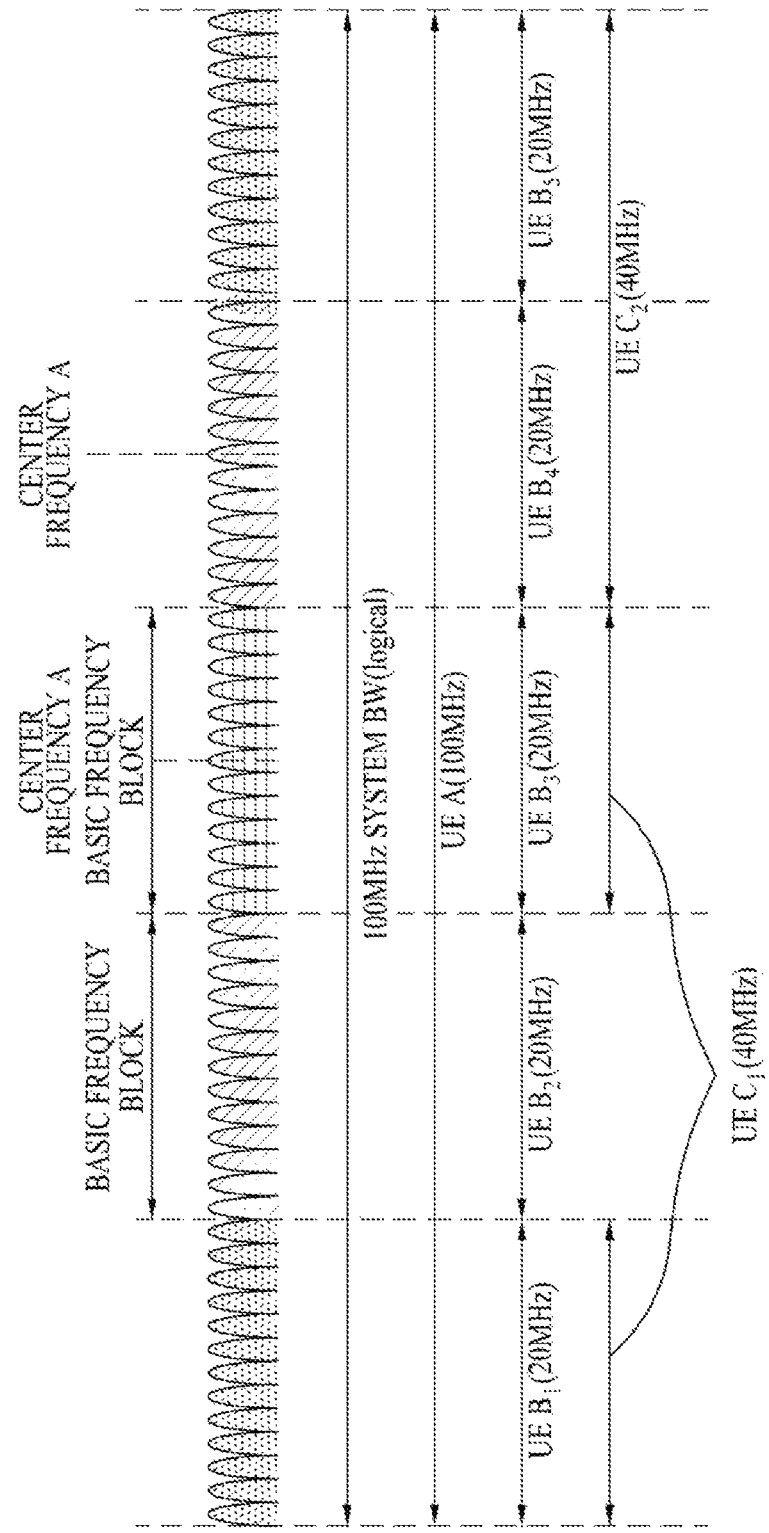
FIG. 7 is a view illustrating concept of a carrier aggregation scheme.

Hereinafter, a carrier aggregation scheme will be described. FIG. 7 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

Figure 8:
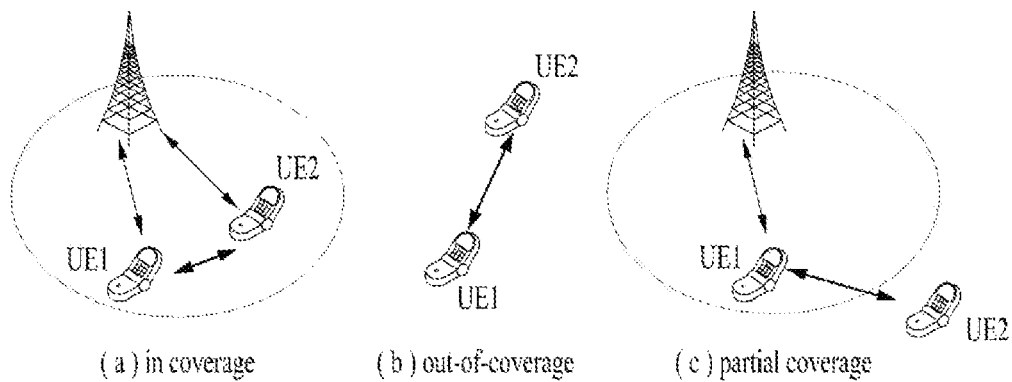
FIG. 8 is a diagram illustrating exemplary scenarios of D2D communication.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 7. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC or a secondary CC.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min\begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}[\text{dBm}] \qquad \text{[Equation 1]}$$

The following equation 2 is used to determine PUSCH transmission power when the serving cell c simultaneously transmits the PUCCH and the PUSCH in the subframe corresponding to the subframe index l in a system supporting carrier aggregation.

$$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}[\text{dBm}] \qquad \text{[Equation 2]}$$

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$ $P_{PUCCH}(i)$ in Equation 2 indicates a linear value of $P_{PUCCH}(i)$ $P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(i)$ provided by the higher layer and is signaled to the UE by the base station.

j is 1 in PUSCH transmission/retransmission according to an uplink grant and is 2 in PUSCH transmission/retransmission according to a random access $P_{O\_NOMINAL\_PUSCH,c}(2)=P_{O\_PRE}$ $\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \in \{0, 0.4, 0.5, 0.6, 0.7, 0.8, 0.9, 1\}$ when j is 0 or 1 and $\alpha_c(j)=1$ when j is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower—higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe $i-K_{PUSCH}$ Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 2.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 3 or one of SET2 of Table 4, determined by a TPC-index parameter provided by the higher layer.

TABLE 3

| TPC Command Field in DCI format 0/3/4 | Accumulated $\delta_{PUSCH, c}$ [dB] | Absolute $\delta_{PUSCH, c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH, c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array} \right\} [dBm]$$

[Equation 3]

In Equation 3, i indicates a subframe index and c indicates a cell index. When a UE is configured by a higher layer to transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{O\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower—higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{rampup}+\delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 5 and 6 show $\delta_{PUCCH}$ indicated by a TPC command in DCI formats. Particularly, Table 5 shows $\delta_{PUCCH}$ indicated in DCI formats other than DCI format 3A and Table 6 shows $\delta_{PUCCH}$ indicated in DCI format 3A.

TABLE 5

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

Equation 4 in the following corresponds to an equation related to power control of a sounding reference signal (SRS) in LTE system.

In Equation 4, i corresponds to a subframe index and c corresponds to a) cell index. In this case, $P_{CMAX,c}(i)$ corresponds to maximum power capable of being transmitted by a UE and $P_{SRS\_OFFSET,c}(m)$ corresponds to a value configured by an upper layer. If m is 0, it may correspond to a case of transmitting a periodic sounding reference signal. If m is not 0, it may correspond to a case of transmitting an aperiodic sounding reference signal. $M_{SRS,c}$ corresponds to a sounding reference signal bandwidth on a subframe index i of a serving cell c and is represented by the number of resource blocks.

$f_c(i)$ corresponds to a value indicating a current PUSCH power control adjustment status for a subframe index i of a serving cell c. $P_{O\_PUSCH,c}(j)$ and $\alpha_c(i)$ are also identical to what is mentioned earlier in Equation 1 and 2.

Hereinafter, a Sounding Reference Signal (SRS) will be described.

The SRS is composed of constant amplitude zero auto correlation (CAZAC) sequences. SRSs transmitted from several UEs are CAZAC sequences $r^{SRS}(n)=r_{u,v}^{(\alpha)}(n)$ having different cyclic shift values a according to Equation 1.

$$\alpha = 2\pi \frac{n_{SRS}^{cs}}{8} \quad \text{[Equation 5]}$$

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, l) from $r^{SRS}(0)$ by Equation 6.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \quad \text{[Equation 6]}$$

where, $k_0$ denotes a frequency domain start point of an SRS and is defined by Equation 7.

$$k_0 = k_0' + \sum_{b=0}^{B_{SRS}} 2M_{sc,b}^{RS} n_b \quad \text{[Equation 7]}$$

where, $n_b$ denotes a frequency location index. $k'_0$ for a general uplink subframe is defined by Equation 8 and $k'_0$ for an uplink pilot time is defined by Equation 9.

$$P_{SRS,c}(i) = \min \begin{cases} P_{CMAX,c}(i) \\ P_{SRS\_OFFSET,c}(m) + 10\log_{10}(M_{SRS,c}) + P_{O\_PUSCH,c}(j) + \alpha_c(j) \cdot PL_c + f_c(i) \end{cases} [\text{dBm}] \quad \text{[Equation 4]}$$

$$k'_0 = (\lfloor N_{RB}^{UL}/2 \rfloor - m_{SRS,0}/2)N_{SC}^{RB} + k_{TC} \qquad \text{[Equation 8]}$$

$$k'_0 = \begin{cases} (N_{RB}^{UL} - m_{SRS,0}^{max})N_{sc}^{RB} + k_{TC} & \text{if } ((n_f \bmod 2) \times (2 - N_{SP}) + n_{hf}) \bmod 2 = 0 \\ k_{TC} & \text{otherwise} \end{cases} \qquad \text{[Equation 9]}$$

In Equations 4 and 5, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 10.

$$M_{sc,b}^{RS} = m_{SRS,b} N_{sc}^{RB}/2 \qquad \text{[Equation 10]}$$

In Equation 10, $m_{SRS,b}$ is a value signaled from an eNB according to an uplink bandwidth $N_{RB}^{UL}$.

The UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 11. Here, $n_{RRC}$ is a parameter received from a higher layer.

$$n_b = \lfloor 4n_{RRC}/m_{SRS,b} \rfloor \bmod N_b \qquad \text{[Equation 11]}$$

Meanwhile, if frequency hopping of the SRS is activated, that is, $b_{hop} < B_{SRS}$, a frequency location index $n_b$ is defined by Equations 12 and 13.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \qquad \text{[Equation 12]}$$

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS}/\prod_{b'=b_{hop}}^{b} N_{b'} \right\rfloor & \text{if } N_b \text{ odd} \end{cases} \qquad \text{[Equation 13]}$$

where, $n_{SRS}$ is a parameter used to calculate the number of times of transmitting the SRS and is defined by Equation 14.

$$n_{SRS} = \begin{cases} 2N_{SP}n_f + 2(N_{SP}-1)\lfloor \dfrac{n_s}{10} \rfloor + \lfloor \dfrac{T_{offset}}{T_{offset\_max}} \rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases} \qquad \text{[Equation 14]}$$

In Equation 14, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Table 7-Table 10 according to FDD and TDD. In particular, Table 7 and Table 8 indicate a FDD system and a TDD system, respectively. Table 7 and Table 8 in the following show a period related to a triggering type 0, i.e., a periodic SRS, and offset information.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |

TABLE 7-continued

| SRS Configuration Index $I_{SRS}$ | SRS Periodicity $T_{SRS}$ (ms) | SRS Subframe Offset $T_{offset}$ |
|---|---|---|
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 8

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |

TABLE 8-continued

| SRS Configuration Index $I_{SRS}$ | SRS Periodicity $T_{SRS}$ (ms) | SRS Subframe Offset $T_{offset}$ |
|---|---|---|
| 157-316 | 160 | $I_{SRS} - 157$ |
| 317-636 | 320 | $I_{SRS} - 317$ |
| 637-1023 | reserved | reserved |

Meanwhile, in case of the periodic SRS, transmission is performed in a subframe satisfying Equation 15 in the following in a FDD system or a TDD system where $T_{SRS}$ is greater than 2 ($T_{SRS} > 2$). Yet, in Equation 15, $k_{SRS}$ corresponds to $\{0, 1, \ldots, 9\}$ in case of the FDD system, whereas $k_{SRS}$ is determined according to Table 9 in the following in case of the TDD system.

$$(10 \cdot n_f + k_{SRS} - T_{offset}) \bmod T_{SRS} = 0 \qquad \text{[Equation 15]}$$

TABLE 9

| | subframe index n | | | | | | | | | |
|---|---|---|---|---|---|---|---|---|---|---|
| | | 1 | | | | | 6 | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

And, in case of a TDD system where $T_{SRS}$ corresponds to 2 in Table 8, transmission is performed in a subframe satisfying Equation 16 in the following.

$$(k_{SRS} - T_{offset}) \bmod 5 = 0 \quad \text{[Equation 16]}$$

Table 10 and Table 11 in the following show a period related to a triggering type 1, i.e., an aperiodic SRS, and offset information. In particular, Table 10 and Table 11 indicate a FDD system and a TDD system, respectively.

TABLE 10

| SRS Configuration Index $I_{SRS}$ | SRS Periodicity $T_{SRS,1}$ (ms) | SRS Subframe $T_{Offset,1}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-31 | reserved | reserved |

TABLE 11

| SRS Configuration Index $I_{SRS}$ | SRS Periodicity $T_{SRS,1}$ (ms) | SRS Subframe $T_{Offset,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-31 | reserved | reserved |

Meanwhile, if a triggering bit of the aperiodic SRS is detected in a subframe #n, an aperiodic SRS corresponding to the triggering bit is transmitted in a first subframe satisfying Equation 17 or Equation 18 in the following appearing after a subframe index #n+k (where k≥4). In particular, Equation 17 in the following is used for a FDD system or a TDD system of which $T_{SRS}$ is greater than 2 ($T_{SRS}$>2) in the Table 11. Equation 18 in the following is used for a TDD system of which $T_{SRS}$ is equal to 2 ($T_{SRS}$=2) in the Table 11. Yet, in case of the FDD system, $k_{SRS}$ corresponds to {0, 1, . . . , 9}. In case of the TDD system, $k_{SRS}$ is determined according to the Table 9.

$$(10 \cdot n_f + k_{SRS} - T_{offset,1}) \bmod T_{SRS,1} = 0 \quad \text{[Equation 17]}$$

$$(k_{SRS} - T_{offset,1}) \bmod 5 = 0 \quad \text{[Equation 18]}$$

Reference Signal (RS)

When a packet is transmitted in a mobile communication system, since the packet is transmitted via a radio channel, a signal may be distorted in the course of transmission. In order for a receiving end to correctly receive the distorted signal, the receiving end may correct the distortion of the transmitted signal as much as channel information by finding out the channel information. In order to find out the channel information, a signal known to both a transmitting end and the receiving end is transmitted and it may find out the channel information with the extent of distortion of the signal when the signal is received on a channel. The signal known to both the transmitting end and the receiving end is called a pilot signal or a reference signal.

A reference signal (RS) is mainly classified into two types according to a usage of the reference signal. The reference signal includes a reference signal used for obtaining channel information and a reference signal used for data demodulation. Since the former one is used for a UE to obtain the channel information in downlink, it is necessary for the RS to be transmitted by a wide band. Although a UE does not receive downlink data in a specific subframe, the UE should be able to receive and measure the RS. The RS used for obtaining the channel information can also be used for measuring handover and the like. The latter one corresponds to an RS transmitted to a corresponding resource together with a downlink resource when a base station transmits the downlink data. A UE can perform channel estimation by receiving the RS and may be then able to demodulate data. The reference signal used for data demodulation is transmitted in a region in which data is transmitted.

When data is transmitted and received through multiple antennas, the receiving ends needs to be aware of a channel state between each transmit antenna and each receive antenna to receive the data correctively. Accordingly, a separate reference signal needs to exist for each transmitting antenna, more particularly, for each antenna port.

A reference signal may be divided into an uplink reference signal, a downlink reference signal, and a sidelink reference signal. According to the current LTE system, the uplink reference signal may include i) a demodulation reference signal (DM-RS) for channel estimation to coherently demodulate information transmitted through a PUSCH and a PUCCH and ii) a sounding reference signal (SRS) for enabling a BS to measure an uplink channel quality of a frequency band at a different network.

On the other hand, the downlink reference signal may include i) a cell-specific reference signal (CRS) shared by all UEs within a cell, ii) a UE-specific reference signal configured for only a specific UE, iii) a demodulation reference signal (DM-RS) transmitted for coherent demodulation when a PDSCH is transmitted, iv) a channel state information-reference signal (CSI-RS) for transmitting channel state information (CSI) when a downlink DMRS is transmitted, v) a multimedia broadcast single frequency network (MBSFN) reference signal transmitted for coherent demodulation of a signal transmitted in MBSFN mode, and vi) a positioning reference signal used to estimate a geographic position information of a UE.

The sidelink reference signal may include a DMRS associated with PSSCH, PSCCH, PSDCJ, or PSBCH and the DMRS is generated/mapped in a scheme similar to PUSCH DMRS. Explanation on PSSCH, PSCCH, PSDCJ, and PSBCH is explained later.

D2D (Device to Device) Communication

In the following, D2D communication based on LTE system is explained. D2D can be referred to as direct communication between UEs or a sidelink. In general, a UE corresponds to a terminal of a user. If such a network device as an eNB transmits and receives a signal according to a D2D communication scheme, the network device can also be considered as a UE as well.

FIG. 8 is a diagram illustrating exemplary scenarios of D2D communication. D2D resources can be allocated from a UL resource (e.g., In case of FDD, a UL frequency resource. In case of TDD, a UL subframe). (a) In case of in-coverage D2D communication, a network controls D2D resources used for D2D communication. The network may allocate a specific resource to a transmission UE or may allocate a pool of D2D resources capable of being selected by a UE. (b) In case of out-of-coverage D2D communication, since a network is unable to directly control a D2D resource, a UE uses a preconfigured D2D resource. (c) In case of partial coverage D2D communication, a UE, which is located at the outside of the coverage, is able to use preconfigured parameters. On the contrary, a UE, which is located within the coverage, is able to use a D2D resource obtained from the network.

For clarity, assume that a UE1 selects a resource unit (RU) corresponding to a specific D2D resource from a resource pool and the UE1 transmits a D2D signal using the selected RS. A resource pool corresponds to a set of D2D resources. Assume that a UE2 corresponding to a reception UE receives information on a resource pool in which the UE1 is able to transmit a signal and detects a signal of the UE1 in the resource pool. In this case, if the UE1 is located within a connection range of an eNB, the eNB can inform the UE1 of information on the resource pool. If the UE1 is located at the outside of the connection range of the eNB, the resource pool can be informed by a different UE or can be determined by a predetermined resource. In general, a resource pool includes a plurality of RUs. A UE selects one or more RUs and may be able to use the selected RUs for transmitting a D2D signal of the UE.

Figure 9:
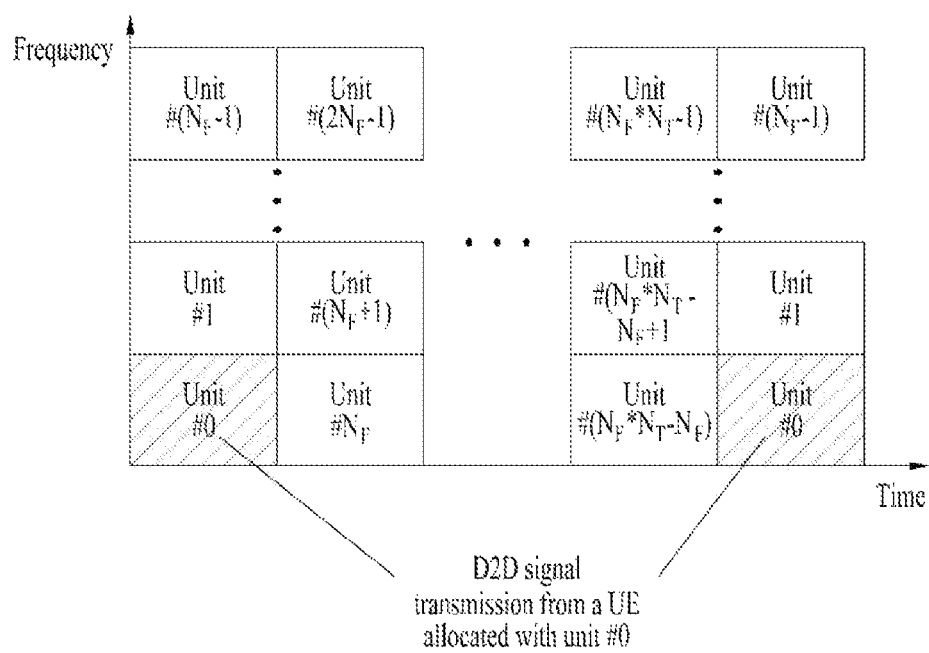
FIG. 9 is a diagram illustrating an example of a D2D RU.

FIG. 9 is a diagram illustrating an example of a D2D RU. For clarity, assume that the entire frequency resources are divided into the $N_F$ number of resource units and the entire time resources are divided into the $N_T$ number of resource units.

In FIG. 9, a resource pool can be repeated with a period of $N_T$ subframes. For example, as shown in FIG. 9, one resource unit may periodically and repeatedly appear.

Or, an index of a physical RU to which a logical RU is mapped may change based on a predetermined pattern over time to obtain a diversity gain in time domain and/or frequency domain. In this RU structure, a resource pool may correspond to a set of resource units capable of being used by a UE intending to transmit a D2D signal.

The aforementioned resource pool can be classified into various types. For example, the resource pool can be classified according to contents of a D2D signal transmitted via each resource pool. For example, the contents of the D2D signal can be classified as follows and a separate resource pool can be configured according to contents of each D2D signal.

Scheduling assignment (SA): The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical RU in a manner of being multiplexed with D2D data. In this case, an SA resource pool may correspond to a pool of resources that an SA and D2D data are transmitted in a manner of being multiplexed. The SA can be referred to as an SCI (side link control channel) and can be transmitted via a D2D control channel (e.g., PSCCH).

D2D data channel: The D2D data channel corresponds to a channel for transmitting user data scheduled by the SA. It may be able to configure a pool of resources for the D2D data channel.

Discovery channel: The discovery channel corresponds to a channel for transmitting a discovery signal including information on an ID of a transmission UE, and the like to enable a neighboring UE to discover the transmission UE. It may be able to configure a resource pool for the discovery channel.

Meanwhile, although contents of D2D signal are identical to each other, it may use a different resource pool according to a transmission/reception attribute of the D2D signal. For example, in case of a D2D data channel of the same type or a discovery channel of the same type, the D2D data channel or the discovery channel can be transmitted in a different resource pool in consideration of (i) a transmission timing determination scheme of a D2D signal (e.g., whether a D2D signal is transmitted at the time of receiving a synchronization reference signal or the timing to which a prescribed timing advance is added), (ii) a resource allocation scheme (e.g., whether a transmission resource of an individual D2D signal is designated by an eNB or a transmission UE autonomously selects a D2D signal transmission resource from a resource pool), (iii) a signal format (e.g., number of symbols occupied by a D2D signal in a subframe, number of subframes used for transmitting a D2D signal), (iv) signal strength from an eNB, (v) strength of transmit power of a D2D UE, and the like.

As mentioned in the foregoing description, such a term as 'D2D' can also be referred to as 'SL (side link)' and 'SA' can also be referred to as PSSCH (physical sidelink control channel). A D2D synchronization signal can be referred to as an SSS (sidelink synchronization signal) and the SSS can be transmitted via a PSBCH (physical sidelink broadcast channel). The PSBCH transmits most basic information (e.g., system information such as SL-MIB, etc.) prior to D2D communication and can also be referred to as a PD2DSCH (physical D2D synchronization channel). A UE transmits a signal (e.g., a discovery signal including an ID of the UE) to a neighboring UE using a discovery channel to inform the neighboring UE of the existence of the UE. The discovery channel is referred to as a PSDCH (physical sidelink discovery channel).

D2D communication of a narrow sense can be distinguished from D2D discovery. For example, if only a UE performing the D2D communication of a narrow sense transmits PSBCH together with SSS (except a UE performing D2D discovery), the SSS can be measured using a DMRS of the PSBCH. An out-of-coverage UE measures the DMRS of the PSBCH (e.g., RSRP, etc.) and may be then able to determine whether or not the UE becomes a synchronization source based on a measurement result.

Figure 10:
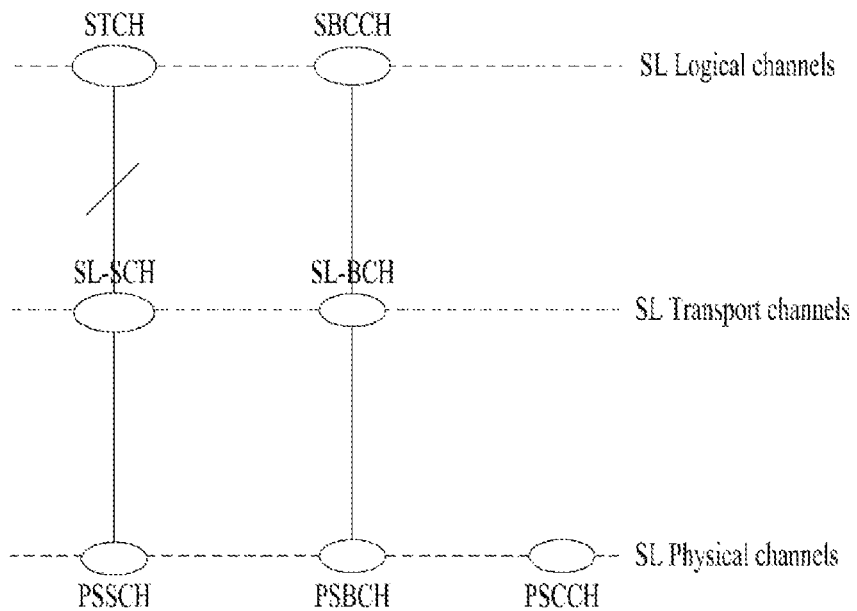
FIG. 10 is a diagram illustrating SL (side link) channels.

FIG. 10 is a diagram illustrating SL (side link) channels. The SL channels shown in FIG. 9 may correspond to channels for performing D2D communication (e.g., D2D communication of a narrow sense).

Referring to FIG. 10, STCH (SL traffic channel) and SBCCH (SL broadcast control channel) correspond to logical channels. The STCH transmits user data received from an application and is connected with SL-SCH (SL shared channel). The SL-SCH corresponding to a transport channel is connected with PSSCH (physical SL shared channel). The SC-SCH signals information necessary for performing synchronization in out-of-coverage or partial coverage scenario or information necessary for performing synchronization between UEs belonging to a different cell. The SBCCH is connected with SL-BCH corresponding to a transport channel. The SC-BCH is connected with PSBCH.

PSCCH (physical SL control channel) performs a role similar to a role of PDCCH in legacy communication performed between a UE and an eNB. The PSCCH is used to transmit SA (scheduling assignment). The SA can also be referred to as SCI (sidelink control information).

For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

For example, in the mode 1, an eNB designates a resource to be used for D2D communication in a resource pool. In the mode 2, a UE selects a resource pool from a set of allocated resource pools and may be able to directly select a D2D resource to be used from the selected resource pool. Hence, it is necessary for the UE to be in an RRC connected state in the mode 1. On the contrary, the UE may be in an RRC idle state or an out-of-coverage state in the mode 2.

Figure 11:
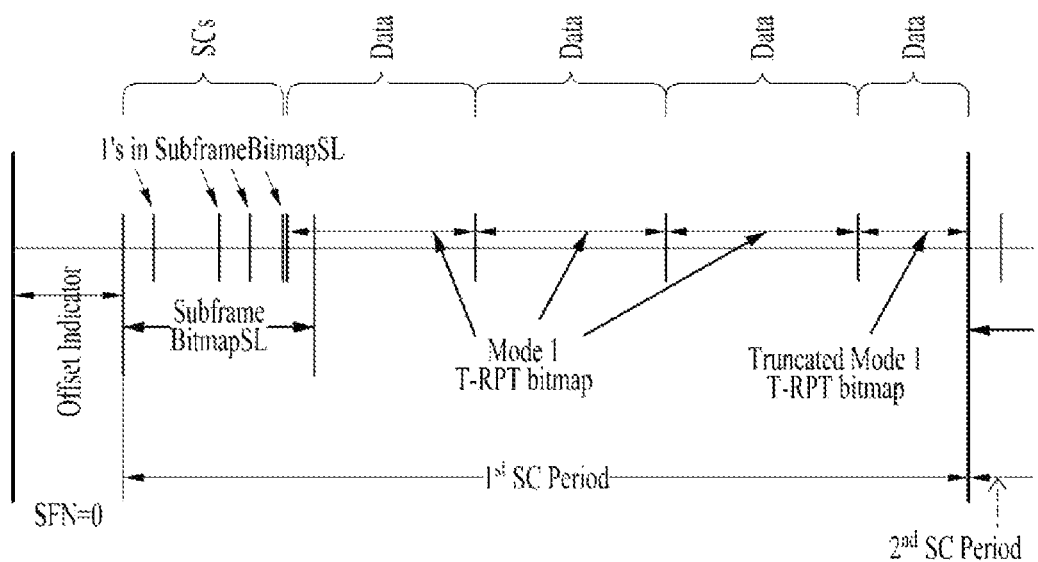
FIG. 11 is a diagram illustrating a D2D communication mode 1.

FIG. 11 is a diagram illustrating a D2D communication mode 1. According to a PSSCH/PSSCH structure for performing D2D communication, a set of subframes (i.e., a subframe bitmap) is divided into two regions (e.g., a control region and a data region). Whether or not a subframe is usable for D2D communication can be indicated via a subframe bitmap.

Referring to FIG. 11, an SC period (SL control period) starts from an offset of SFN=0 and can be periodically repeated. The SC period starts from a control region including SCI transmitted by PSCCH and 'SubframeBitmapSL' corresponding to a higher layer parameter indicates a subframe in which PSCCH is transmitted. A data region starts after the last bit configured by 1 in the 'SubframeBitmapSL'. The data region corresponds to a T-RPT bitmap corresponding to a different bitmap. The T-RPT bitmap indicates subframes in which data is transmitted. As shown in FIG. 11, a subframe pattern indicated by the T-RPT bitmap is repeated until the SC period ends. The last T-RPT bitmap is truncated according to the end of the SC-period. The T-RPT bitmap can be dynamically configured and can be differently configured according to each SC-period and each UE.

In most part, the mode 2 operates in a manner of being similar to the mode 1 shown in FIG. 11. Yet, there is a difference between the mode 1 and the mode 2 in that a start point of a data region is not determined based on SubframeBitmapSL in the mode 2. In the mode 2, the start point of the data region has a fixed offset from a start point of an SC period.

Relay Operation in D2D Communication

In the following, a method of allocating a resource, a method of configuring power of a D2D device, and the like are proposed to efficiently perform a relaying operation in D2D communication.

In the embodiments described in the following, 'D2D' may correspond to a concept including V2V (vehicle-to-vehicle), V2I (vehicle-to-infra), and V2P (vehicle-to-personal). In the embodiments of the present invention, a relay is not restricted to a legacy relay and can include a device configured to relay a D2D signal such as an RSU (road side unit), a UE-type RSU, an eNB-type RSU, and the like.

Categorization of Messages

A D2D signal can include various types of messages including an emergency message, an advertisement message, a personal information message, and the like. As the use frequency of D2D communication is increasing, a D2D receiver/D2D relay may perform an inefficient D2D operation such as receiving/relaying an unnecessary D2D message, and the like.

In order to solve the problem above and efficiently receive/relay a D2D signal, one embodiment of the present invention proposes to perform categorization on a message which is forwarded using a D2D scheme.

It may be able to perform categorization on a D2D message based on a message type. And, the message type may correspond to a priority of a message. For example, it can be comprehended as a priority is determined according to a type of a D2D message. As a more specific example, D2D messages for a disaster situation (e.g., earthquake, tsunami, fire, etc.) are designated as a D2D message group (e.g., a first type message group) and D2D messages for commercial advertisement can be designated as a different D2D message group (e.g., a second type message group). If necessary (or, according to a predefinition), a priority of the message group for the disaster situation can be defined to be higher than a priority of a different message group.

For example, a D2D receiver or a D2D relay broadcasts a message group (e.g., a message type) preferred by the D2D receiver or the D2D relay in advance based on the D2D message categorization and may be than able to perform decoding/relaying on the preferred message group only. More specifically, the D2D receiver or the D2D relay can inform neighboring D2D UEs of a message group preferred by the D2D receiver or the D2D relay or a message group to be received by the D2D receiver or the D2D relay via such a channel as a discovery channel (e.g., PSDCH), a broadcast channel (e.g., PSBCH), a control channel (e.g., PSCCH), a data channel (e.g., PSDCH), or the like. Having broadcasted a specific message group, the D2D receiver or the D2D relay can perform decoding on a different message group rather than the specific message group with a low decoding priority or may not perform decoding on the different message group. Hence, the D2D UEs adjacent to the D2D relay are able to determine whether or not it is feasible to relay each message group via the D2D relay in advance.

As a different example of performing the message categorization, a resource pool can be individually configured in each of message groups. For example, it may be able to configure a D2D signal for a specific message group to be transmitted in a specific resource pool only. A control unit such as an eNB, an RSU, and the like can broadcast corresponding information. For example, the control unit can broadcast information on a resource pool in which each message group is transmitted. Or, the control unit such as an eNB, an RSU, and the like can broadcast information on an available resource pool.

In particular, as an implementation example of a method of performing mapping between a message group and a resource, it may be able to configure a channel for performing transmission and reception in every message group. For example, a specific message group can be transmitted or received on a specific channel. In the present embodiment, a channel can be defined as a channel bandwidth according to current standard. Or, a channel may correspond to resource regions mutually identifiable via filtering of a hardware/software scheme.

Information Broadcasting for Receiving/Relaying Operation

A D2D receiver or a D2D relay can broadcast information described in the following to efficiently perform a receiving/relaying operation. A single information element or a combination of information elements described in the following can be broadcasted near the D2D receiver or the D2D relay. The information can be broadcasted via the aforementioned D2D channel, by which the present invention may be non-limited. For clarity, embodiments described in the following are described in the aspect of a D2D relay. Yet, not only the aforementioned embodiment but also the embodiments described in the following can be performed by a D2D receiver as well.

1. Message Types

A D2D relay can broadcast a message type for performing a relaying operation performed by the D2D relay. As mentioned in the foregoing description, a message type rather than the message type broadcasted by the D2D relay can be relayed with a lower priority or may not be relayed.

A D2D transmitter receives information on a message type from the D2D relay and can determine whether or not a D2D message transmitted by the D2D transmitter is relayed by the D2D relay. For example, when the D2D transmitter receives information on a message type from the D2D relay, assume that the D2D transmitter transmits a message of a type (e.g., second type) different from a message type (e.g., first type) broadcasted by the D2D relay. In this case, the D2D transmitter can transmit a message of a different type (e.g., second type) under the assumption that the message of the different type (e.g., second type) is not relayed. In particular, the D2D transmitter may not expect that the D2D relay is going to relay the message of the different type (e.g., second type) transmitted by the D2D transmitter.

2. Capacity of D2D Relay

A D2D relay can broadcast a size of data capable of being maximally or additionally relayed by the D2D relay. For example, the size of the data capable of being additionally relayed by the D2D relay may correspond to a D2D data size or headroom of D2D relay capacity capable of being additionally relayed by the D2D relay in addition to a current D2D relaying operation currently performed by the D2D relay.

A D2D transmitter receives information on relaying capacity from the D2D relay and can determine whether or not D2D data transmitted by the D2D transmitter is relayed by the D2D relay. For example, having received the information on the relaying capacity, the D2D transmitter assumes that the D2D transmitter intends to transmit D2D data of a size greater than a size of the relaying capacity of the D2D relay. In this case, the D2D transmitter can perform D2D transmission under the assumption that the D2D data of the size greater than the size of the relaying capacity is not going to be relayed. In particular, the D2D transmitter may not expect that the D2D relay is going to relay the D2D data of the size greater than the size of the relaying capacity.

3. Power Restriction

When a D2D relay receives a plurality of D2D signals, if a difference in reception power between D2D signals is big, due to in-band emission of a D2D signal of strong power, it may be difficult to receive a different D2D signal.

FIG. 12 illustrates interference between D2D signals due to in-band emission. The in-band emission corresponds to unwanted radiation capable of causing interference on a neighboring frequency resource within a band. As a power size increases, a size of interference due to the in-band emission increases as well.

Referring to FIG. 12 (a), a D2D relay receives a D2D signal 1 from a UE 1 and receives a D2D signal 2 from a UE 2, respectively. In this case, assume that the D2D signal 1 and the D2D signal 2 are transmitted on frequencies different from each other and adjacent to each other within a band.

Referring to FIG. 12 (b), since a power level of the D2D signal 1 received on f1 frequency is very high, a size of interference caused by the in-band emission of the D2D signal 1 affecting f2 frequency domain is considerably high compared to a power level of the D2D signal 2 received on f2 frequency. As a result, the D2D relay may fail to correctly receive a D2D signal from the UE 2 due to the impact of the in-band emission. In particular, if the UE1/UE2 is in an out-of-coverage state, since an eNB is unable to control transmit power of the UE1/UE2, interference caused by the in-band emission may cause a more serious problem. Although the in-band emission between D2D signals is illustrated in FIG. 12, a similar in-band emission problem may occur between a D2D signal and a cellular signal (e.g., UE-eNB communication) as well.

In order to solve the problem, if a specific D2D signal is received with high power and reception capability of receiving a different D2D signal is degraded due to the specific D2D signal, a D2D relay may ask a D2D transmitter, which has transmitted the specific D2D signal, to lower transmit power or may broadcast prescribed information. For example, the broadcasted prescribed information can include at least one selected form the group consisting of information for asking the D2D transmitter to lower transmit power, information for triggering transmit power to be lowered, information on interference caused by the specific D2D signal, information on the specific D2D signal causing interference, information on a resource of the specific D2D signal, and information on the D2D transmitter which has transmitted the specific D2D signal, by which the present invention may be non-limited.

When the D2D relay broadcasts prescribed information, for example, when the D2D relay broadcasts information on a specific D2D signal received with high power, the D2D relay can broadcast resource information used for transmitting the specific D2D signal or an ID of the D2D transmitter. In addition, the D2D relay can broadcast a power reduction value. The D2D relay can transmit an HII (high interference indicator). In particular, the D2D relay can notify a resource causing interference (e.g., interference caused by in-band emission) among resources from which the D2D relay receives a D2D signal. Among D2D devices receiving the prescribed information from the D2D relay, a D2D transmitter transmitting a specific D2D signal via a corresponding resource can control transmit power of the D2D transmitter.

As a different example of controlling reception power, the D2D relay may broadcast the maximum reception power. For example, the D2D relay may broadcast the maximum reception power permitted to a second D2D signal on the basis of a first D2D signal having minimum reception power, i.e., within a range of not causing a decoding failure of the first D2D signal, among received D2D signals (e.g., D2D signals capable of being decoded). Or, the D2D relay can broadcast a power level of a D2D signal having the maximum reception power among the received D2D signals capable of being decoded. Or, the D2D relay may broadcast the maximum reception power within a range of not causing reduction of reception capability due to in-band emission.

If the D2D transmitter receives corresponding information from the D2D relay, the D2D transmitter calculates pathloss and the like on the basis of a reference signal (or, a synchronization signal) transmitted by the D2D relay and may be then able to configure transmit power within a range not exceeding the signaled maximum reception power. For example, the D2D transmitter can estimate a pathloss to be experienced by a D2D signal transmitted by the D2D transmitter based on a pathloss of the reference signal received from the D2D relay. The D2D transmitter can estimate reception power of the D2D signal arrived at the D2D relay from transmit power of the D2D signal under the assumption that power reduction occurs as much as the estimated pathloss. In particular, the D2D transmitter can control transmit power of a D2D signal in a manner that reception power of the D2D signal arrived at the D2D relay does not exceed the maximum reception power broadcasted by the D2D relay.

Power Control of D2D Device

As mentioned in the foregoing description, the D2D relay can relay a plurality of D2D signals. In this case, if a reception power difference between relayed D2D signals is big, in-band emission caused by a D2D signal received with relatively high power may act as interference in performing decoding on a D2D signal received with low power.

In order to solve the problem above, according to one embodiment of the present invention, a D2D device (e.g., D2D transmitter) can control transmit power of a D2D signal in consideration of a target device (e.g., D2D receiver, D2D relay, and the like) to which the D2D signal is transmitted by the D2D device. The D2D device can control the transmit power of the D2D signal in consideration of not only the target device of the D2D signal but also the information (prescribed information received from the D2D relay) mentioned earlier in the aforementioned embodiments.

As a simple example, the D2D device can configure transmit power of a D2D signal transmitted to a neighboring D2D device (e.g., D2D receiver) to be different from transmit power of a D2D signal transmitted to a D2D relay.

Transmit power control controlled by a D2D device (e.g., D2D transmitter) in consideration of a target device can be performed in a manner of being associated with at least a part of the aforementioned embodiments. For example, as mentioned in the foregoing description, a D2D device (e.g., D2D relay) configured to relay a D2D signal may individually broadcast a message type to be relayed by the D2D device, capacity capable of additionally relaying a D2D signal, and power restriction information for precisely measuring a plurality of D2D signals, or a combination thereof.

Having received the information, a D2D device (e.g., D2D transmitter) can determine transmit power of a D2D signal to be relayed by the D2D relay based on the information received from the D2D relay.

On the contrary, if a D2D device (e.g., D2D transmitter) transmits a D2D signal to a general D2D device (e.g., D2D receiver) rather than a D2D relay, if the D2D device transmits a D2D signal incapable of being relayed by a nearby D2D relay, or if a D2D relay does not exist near the D2D device, the D2D device (e.g., D2D transmitter) may transmit a D2D signal with higher power (power higher than power for transmitting a D2D signal to a D2D relay) to widen the coverage of the D2D signal transmitted by the D2D device. Or, the D2D device can transmit a corresponding signal with power defined in advance.

When a D2D transmitter transmit a D2D signal to be relayed, the D2D transmitter can determine transmit power of the D2D signal in consideration of capacity and the like of D2D relays located in the vicinity of the D2D transmitter. For example, transmit power of a D2D signal to be relayed is controlled in consideration of capacity and the like of neighboring D2D relays. On the contrary, if a D2D signal is not to be relayed, the transmit power restriction may not be applied to the D2D signal.

According to one embodiment, it may be able to determine transmit power by configuring a plurality of parameters for OLPC (open loop power control) and applying a different parameter according to the proposed conditions (e.g., a message type, relay capacity, and power restriction).

For example, in current LTE-based D2D communications, PSSCH transmit power is defined as (1) and (2) described in the following.

(1) For a sidelink transmission mode 1 and a PSCCH period i, UE transmit power $P_{PSSCH}$ is provided as follows.
(i) If a TPC command field included in SL grant configured for the PSCCH period i is set to 0, it can be represented as $P_{PSSCH}=P_{CMAX,PSSCH}$. (ii) If a TPC command field included in SL grant configured for the PSCCH period i is set to 1, $P_{PSSCH}$ is represented by equation 19 described in the following.

$$P_{PSSCH}=\min\{P_{CMAX,PSSCH}, 10\log_{10}(M_{PSSCH})+P_{O\_PSSCH,1}+\alpha_{PSSCH,1}\cdot PL\} \text{ [dBm]} \quad \text{[Equation 19]}$$

(2) In a sidelink transmission mode 2, UE transmit power $P_{PSSCH}$ is represented by equation 20 described in the following.

$$P_{PSSCH}=\min\{P_{CMAX,PSSCH}, 10\log_{10}(M_{PSSCH})+P_{O\_PSSCH,2}+\alpha_{PSSCH,2}\cdot PL\} \text{ [dBm]} \quad \text{[Equation 20]}$$

In equations 19 and 20, $P_{CMAX,\ PSSCH}$ corresponds to a value defined in a standard document (3GPP TS 36.101) and $M_{PSSCH}$ corresponds to a bandwidth of PSSCH resource allocation represented by the number of resource blocks. PL=PLc is satisfied. As mentioned in the foregoing description, the PLc corresponds to a pathloss parameter in a serving cell c. $P_{O\_PSSCH,1}$ corresponds to a higher layer parameter modelDataPo and $P_{O\_PSSCH,2}$ corresponds to a higher layer parameter mode2DataPo. $\alpha_{PSSCH,1}$ corresponds to a higher layer parameter mode1DataAlpha and $\alpha_{PSSCH,2}$ corresponds to a higher layer parameter mode2DataAlpha.

In particular, according to the schemes (1) and (2), parameters $\{P_{CMAX,\ PSSCH}, P_{O\_PSSCH,1}, P_{O\_PSSCH,2}, \alpha_{PSSCH,1}, \alpha_{PSSCH,2}\}$ are set to a D2D device in advance via higher layer signaling. Subsequently, the D2D device determines transmit power of PSSCH by substituting a corresponding parameter to the equation 19/20 according to an SL (sidelink) transmission mode and TPC of an SL grant.

One embodiment of the present invention proposes to introduce an additional parameter to determine transmit power in the aforementioned D2D communication environment. For example, the parameter $P_{CMAX,PSSCH}$ mentioned earlier in the equation 19/20 is configured by $P_{CMAX,PSSCH\_HIGH}$ and an additional parameter $P_{CMAX,PSSCH\_LOW}$ can be newly configured for low transmit power. For example, when a D2D device (e.g., D2D transmitter) transmits a D2D signal of a message type relayed by a D2D relay, when relaying capacity of a D2D relay is sufficient (e.g., when it is anticipated that a D2D signal transmitted by a D2D transmitter is going to be relayed because the D2D signal does not exceed the relaying capacity of the D2D relay), or when power restriction is applied to a D2D signal transmitted by the D2D transmitter, the D2D device (e.g., D2D transmitter) can determine transmit power by substituting the $P_{CMAX,PSSCH\_LOW}$ to the equation 19/20. In this case, the $P_{CMAX,PSSCH\_LOW}$ can be defined/configured by a network in advance or can be determined by a parameter broadcasted by a nearby D2D relay (e.g., relaying UE).

Similar to the scheme of configuring the $P_{CMAX,PSSCH\_LOW}$ in addition to the $P_{CMAX,PSSCH\_HIGH}$, an additional parameter corresponding to all or a part of parameters $\{P_{CMAX,PSSCH}, P_{O\_PSSCH,1}, P_{O\_PSSCH,2}, \alpha_{PSSCH,1}, \alpha_{PSSCH,2}\}$ can be defined according to a required power level. A D2D transmitter can determine transmit power appropriate for current D2D communication environment using the additionally configured/defined parameters.

High Power Allocated to Prioritized PSSCH

According to one embodiment, a D2D relay can be configured to receive messages of all types or all priorities irrespective of a message type or a message priority. When the D2D relay receives messages of a different type or a different priority, in order to enable the D2D relay to relay a message of a specific type or a message of a high priority, a D2D transmitter can transmit the message of the specific type or the message of the high priority with higher power. For example, transmit power of a message or the maximum transmit power of a message can be comprehended according to a priority of the message or a type of the message.

If a D2D device (e.g., D2D transmitter) determines transmit power using the aforementioned scheme, a message received by a D2D relay with low power experiences strong interference by in-band emission of a message received with high power. On the contrary, since it is able to maintain relatively low interference for a message (e.g., a message of a high priority) received by the D2D relay with high power, it is able to determine a reception probability according to a priority of a message. As an implementation example of the present embodiment, the aforementioned power configuration parameter can be configured according to a message type or a message priority. For example, the power configuration parameter can be configured according to a message type or a message priority.

As a different example, a reference signal sequence having a high priority message (e.g., a reference signal for PSCCH/PSSCH) can be configured in a manner of being different from a reference signal sequence having a low priority message. For example, a reference signal may correspond to a PSCCH DMRS or a PSSCH DMRS for demodulating PSCCH or PSSCH, by which the present invention may be non-limited.

This can be implemented by a method of differently configuring a part of reference signal parameters according to a priority. The reference signal parameters may correspond to parameters related to generation and/or mapping of a reference signal sequence. For example, the parameters related to generation and/or mapping of a reference signal sequence may include a basic sequence number, an RS sequence scrambling ID, an RS sequence cyclic shift value, an orthogonal sequence covered by an RS sequence, and the like, by which the present invention may be non-limited.

For example, it may consider a method of using a parameter (e.g., scrambling ID) $n_{ID}^{SA}$ for generating/mapping an SL DMRS reference signal. The parameter $n_{ID}^{SA}$ corresponds to a parameter for determining hopping of a base sequence group, a cyclic shift value, and/or an orthogonal sequence. According to one embodiment, it may be able to configure $n_{ID}^{SA}$ for a high priority and $n_{ID}^{SA}$ for a low priority, respectively. Or, it may be able to configure $n_{ID}^{SA}$ for each of a plurality of priorities. Hence, it may be able to configure a form (e.g., sequence generation/mapping) of an RS to be changed according to a priority. Or, it may be able to differently configure a base sequence (e.g., uses a different $N_{ID}^{cell}$ according to a priority), differently configure a cyclic shift (CS), or differently configure an OCC (orthogonal cover code) according to a priority to distinguish priorities from each other.

If a priority is indicated according to a message type, it may indicate that a different power configuration and/or a different reference signal sequence is configured according to a message type.

Figure 13:
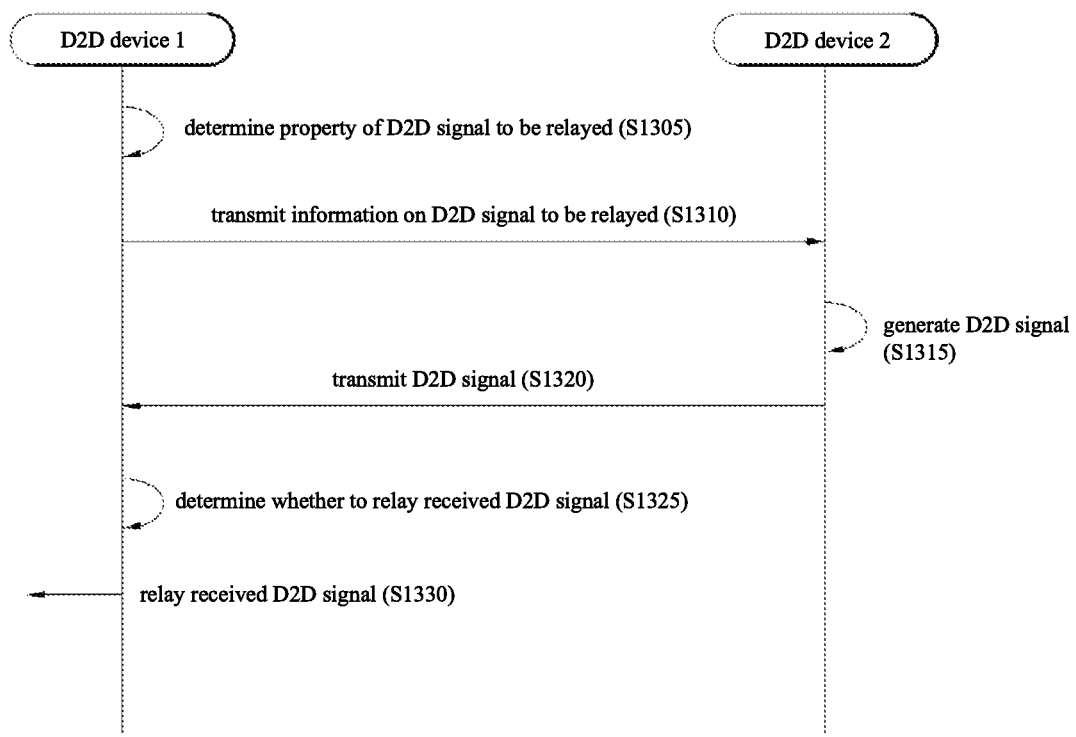
FIG. 13 is a flowchart for a method of transmitting or receiving a D2D signal according to one embodiment of the present invention.

FIG. 13 is a flowchart for a method of transmitting or receiving a D2D signal according to one embodiment of the present invention. Explanation on contents overlapped with the aforementioned contents is omitted. Assume that a D2D device 1 corresponds to a D2D relay configured to relay a D2D signal and a D2D device 2 corresponds to a D2D transmitter configured to transmit a D2D signal to be relayed. For clarity, two D2D devices are depicted. Yet, a plurality of D2D transmitters and/or a plurality of D2D relays may exist.

First of all, a D2D device determines a property of a D2D signal to be relayed by the D2D device [S1305]. For example, the property of the D2D signal can include at least one of information on D2D power, information on a D2D signal type, information on a D2D signal priority, and information on a data size of a D2D signal capable of being relayed, by which the present invention may be non-limited.

The information on the D2D power can be determined in consideration of a reception power difference between D2D signals transmitted on frequencies adjacent to each other. For example, assume that a D2D device 1 has received a plurality of D2D signals. A plurality of the D2D signals correspond to D2D signals transmitted on frequencies adjacent to each other within the same band. A plurality of the D2D signal can be received from D2D transmitters different from each other, by which the present invention may be non-limited.

For example, the information on the D2D power may indicate the maximum reception power level of a D2D signal to be related by the D2D device 1. Specifically, the maximum reception power level may correspond to the maximum reception power permitted to a first D2D signal within a range of not causing a decoding failure of a second D2D signal having the minimum reception power among D2D signals transmitted on frequencies adjacent to each other.

And, the information on the D2D power can also be used for reducing interference caused by reception power of a first D2D signal transmitted on a first frequency affecting a second D2D signal transmitted on a second frequency. For example, the information on the D2D power can include at least one of information on a resource of the first D2D signal interfering the second D2D signal, information on a transmitter of the first D2D signal, and a power reduction value required by the first D2D signal, by which the present invention may be non-limited.

The D2D device 1 transmits information on a D2D signal to be relayed by the D2D device 1 to a neighboring terminal [S1310]. The information on the D2D signal can include information on D2D power. The information on the D2D signal can include information on a type of the D2D signal to be relayed by the D2D device 1. The information on the D2D signal can include information on a data size capable of being relayed by the D2D device 1.

The D2D device 2 generates and transmits a D2D signal [S1315, S1320]. The D2D signal can include at least one of a D2D control signal, a D2D data signal, a D2D discovery signal, a D2D broadcasting signal, a D2D synchronization signal, and a D2D reference signal, by which the present invention may be non-limited. The D2D device 2 can determined transmit power of the D2D signal based on a message type. The D2D device 2 can select a transmit power parameter and a reference signal parameter to be used for transmitting the D2D signal in consideration of whether or not the D2D signal is relayed by the D2D device 1.

The D2D device 1 determined whether to relay the received D2D signal and can relay the D2D signal according to a result of the determination [S1325, S1330]. For example, if a D2D signal has a message type different from a message type selected by the D2D device 1, the D2D device 1 may relay the D2D signal with a low priority or may not relay the D2D signal.

Figure 14:
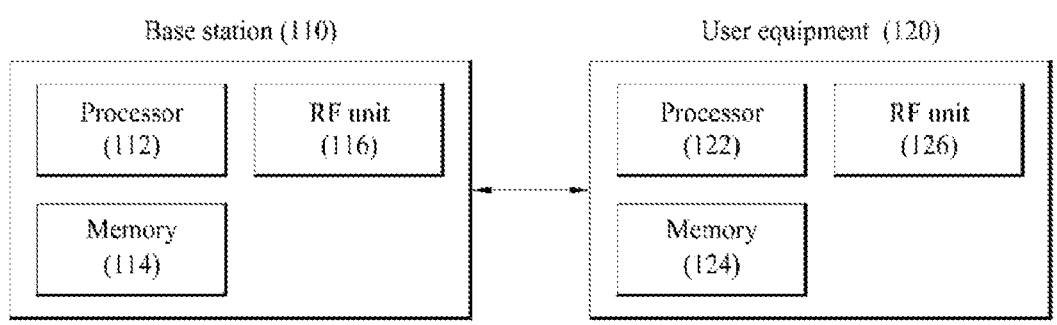
FIG. 14 is a diagram illustrating D2D devices according to one embodiment of the present invention.

FIG. 14 is a diagram illustrating D2D devices according to one embodiment of the present invention. The D2D devices shown in FIG. 14 can perform a signal transmission and reception operation according to the aforementioned embodiments.

Referring to FIG. 14, a wireless communication system includes a D2D transmission device 110 and a D2D reception device 120. In a D2D relay operation, the D2D reception device 120 may operate as a D2D relay. The D2D transmission device 110 includes a processor 112, a memory 114, and a radio frequency (RF) unit 116. The processor 112 can be configured to implement procedures and/or methods proposed by the present invention. The memory 114 is connected with the processor 112 and stores various information related to the operation of the processor 112. The RF unit 116 is connected with the processor 112 and transmits and/or receives a radio signal. The D2D reception device 120 includes a processor 122, a memory 124, and a radio frequency (RF) unit 126. The processor 122 can be configured to implement procedures and/or methods proposed by the present invention. The memory 124 is connected with the processor 122 and stores various information related to the operation of the processor 122. The RF unit 126 is connected with the processor 122 and transmits and/or receives a radio signal. The D2D transmission device 110 and/or the D2D reception device 120 may have a single antenna or multiple antennas.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', etc.

The above-described embodiments of the present invention can be implemented by a variety of means, for example, hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention as described above are applicable to various wireless communication systems such as the 3GPP wireless communication system.

What is claimed is:

1. A method for transmitting a sidelink signal by a user equipment (UE) in a wireless communication system, the method comprising:
configuring and a power configuration parameter related to each of priority levels of the sidelink signal;
determining a transmission power of the sidelink signal based on the power configuration parameter; and
transmitting, to other UE, the sidelink signal based on the determined transmission power,
wherein the power configuration parameter includes an information related to a maximum transmission power related to the each of the priority levels,
wherein the transmission power of the sidelink signal is determined based on the information related to the maximum transmission power related to a priority level of the transmitted sidelink signal, and wherein the sidelink signal is a physical sidelink shared channel (PSSCH).

2. The method of claim 1, wherein a maximum transmission power of a sidelink signal with a higher priority level is greater than a maximum transmission power of a sidelink signal with a lower priority level.

3. The method of claim 2, wherein a reference signal (RS) sequence of the sidelink signal with the higher priority level and a RS sequence of the sidelink signal with the lower priority level are differently configured.

4. A user equipment (UE) configured to transmit a sidelink signal in a wireless communication system, the UE comprising:

a radio frequency (RF) unit; and a processor operatively coupled to the RF unit, wherein the processor is configured to:

configuring a power configuration parameter related to each of priority levels of the sidelink signal, determine a transmission power of the sidelink signal based on the power configuration parameter, and transmit, to other UE, the sidelink signal based on the determined transmission power, wherein the power configuration parameter includes an information related to a maximum transmission power related to the each of the priority levels, wherein the transmission power of the sidelink signal is determined based on the information related to the maximum transmission power related to a priority level of the transmitted sidelink signal, and wherein the sidelink signal is a physical sidelink shared channel (PSSCH).

5. The UE of claim 4, wherein a maximum transmission power of a sidelink signal with a higher priority level is greater than a maximum transmission power of a sidelink signal with a lower priority level.

6. The method of claim 5, wherein a reference signal (RS) sequence of the sidelink signal with the higher priority level and a RS sequence of the sidelink signal with the lower priority level are differently configured.

* * * * *